United States Patent
Giles et al.

(10) Patent No.: US 6,986,047 B2
(45) Date of Patent: Jan. 10, 2006

(54) METHOD AND APPARATUS FOR SERVING CONTENT FROM A SEMI-TRUSTED SERVER

(75) Inventors: James Ryan Giles, Yorktown Heights, NY (US); Reiner Sailer, Yorktown Heights, NY (US); Dinesh Chandra Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 09/853,164

(22) Filed: May 10, 2001

(65) Prior Publication Data

US 2002/0169961 A1 Nov. 14, 2002

(51) Int. Cl.
*G06F 17/00* (2006.01)

(52) U.S. Cl. .................. 713/175; 713/170; 713/153; 713/156

(58) Field of Classification Search ......... 713/170–176, 713/200–201, 150–156; 709/223–225
See application file for complete search history.

(56) References Cited

U.S. PATENT DOCUMENTS

| | | | |
|---|---|---|---|
| 5,857,191 A | 1/1999 | Blackwell, Jr. et al. | |
| 5,875,296 A | 2/1999 | Shi et al. | |
| 6,067,623 A | 5/2000 | Blakley, III et al. | |
| 6,138,162 A | 10/2000 | Pistriotto et al. | |
| 6,330,605 B1 | 12/2001 | Christensen et al. | |

OTHER PUBLICATIONS http://www3.ca.com/Files/DataSheets/etrust_web_access_control_data_sheet.pdf.* http://publib.boulder.ibm.com/infocenter/wasinfo/index.jsp-?topic=/com.ibm.wasee.doc/info/ee/ae/csec_trust.html.*

* cited by examiner

*Primary Examiner*—David Jung
(74) *Attorney, Agent, or Firm*—Louis P Herzberg

(57) ABSTRACT

This invention provides methods and apparatus for enabling access to restricted information contained at a semi-trusted web-server. Restricted information is information that is only available to a selected group of authorized clients. A client desiring access to the restricted information authenticates itself with a trusted web-server, and obtains a client credential. The client then contacts the semi-trusted web-server with the credential and obtains access to the restricted content. The restricted information may be encrypted at the semi-trusted web-server, so that the restricted information is secure even if the semi-trusted web-server is not completely secure.

46 Claims, 18 Drawing Sheets

METHOD AND APPARATUS FOR SERVING CONTENT FROM A SEMI-TRUSTED SERVER

FIELD OF THE INVENTION

This invention is directed to the field of computer networks. It is more particularly directed to the Internet and specifically to web-servers which store and transmit information to their clients.

BACKGROUND OF THE INVENTION

Much of the communication in the Internet involves at least one client making a request to a web-server, and the web-server responding to the client's request. By web-server, we mean a device or collection of devices (e.g., datastore, directory, machines, and software) that communicates with a client using the HTTP Protocol. For a particular web application, we define an origin web-server to be a web-server that is completely trusted with the functions and data of a web application with regard to the security policy for the application.

As a way to shorten the length of time that the client must wait for a response and to lighten the load on the Internet and origin web-server, techniques have been developed to allow the client to be serviced by a proxy web-server, also referred to simply as a proxy, where the proxy web-server is usually closer to the client or more lightly loaded than the origin web-server.

Proxy web-servers can be integrated into the Internet communication process in several different ways. In some configurations, clients always make requests to a proxy web-server rather than the origin web-server. The proxy web-server may respond to the client, fetching content from the origin web-server as necessary, or the proxy web-server may refer the client to another proxy web-server or the origin server if the proxy web-server is unable to satisfy the client's request. In other configurations, a client first makes a request to the origin web-server. The origin web-server may refer the client to a proxy for the current request or all future requests, or the origin web-server may respond to part of the client's request, but refer the client to a semi-trusted web-server for a portion of the response.

In most cases, the content offloaded to a proxy web-server has been limited to non-sensitive data, so that access control schemes are not required. Non-sensitive data is defined as data which does not require any access control, and may be accessible to any user on the network. On a typical web-page, embedded images are an example of non-sensitive data. On the other hand, restricted data or sensitive data is defined as data which has some restrictions on who can obtain it. Examples of restricted data include pages that are obtained by subscription to a set of registered users, images that are available to a restricted set of users, or data can is personalized for a specific user.

Common subscription services and personalized content on the Internet are increasing, and they should also benefit from the performance gains afforded by proxy web-servers. The restricted information requires the proxy web-servers to have access control methods in place, but the situation is complicated because in many cases the proxy web-servers are not under the control of the content providers. Such proxy web-servers fall into the class'of semi-trusted web-servers. For a particular web application, we define a semi-trusted web-server to be a web-server that is partially trusted for the functions of the application with regard to the security policy for the application. In particular, a semi-trusted web-server may be trusted for authorization, access to user identifiers, SSL tunneling to an origin web-server for content, and non-sensitive transactions, but the semi-trusted web-server may not be trusted with long-term sensitive data such as user passwords or secret keys for an origin web-server.

SUMMARY OF THE INVENTION

It is therefore an aspect of the present invention to provide a method to enable a client to access restricted information from an origin web-server through a semi-trusted web-server.

It is a further aspect of the invention to provide an apparatus to enable a client to access restricted information from an origin web-server through a semi-trusted web-server.

It is a further aspect of the invention to reduce the security risk of using cookies for authentication.

It is a further aspect of the invention to protect data stored at a semi-trusted web-server.

In an example of the invention, a client would use the method disclosed herein to gain access to restricted information at a semi-trusted web-server.

BRIEF DESCRIPTION OF THE DRAWINGS

These and other aspects, features, and advantages of the present invention will become apparent upon further consideration of the following detailed description of the invention when read in conjunction with the drawing figures, in which.

Other objects and a better understanding of the invention may be realized by referring to the detailed description.

DESCRIPTION OF THE INVENTION

Figure 1:
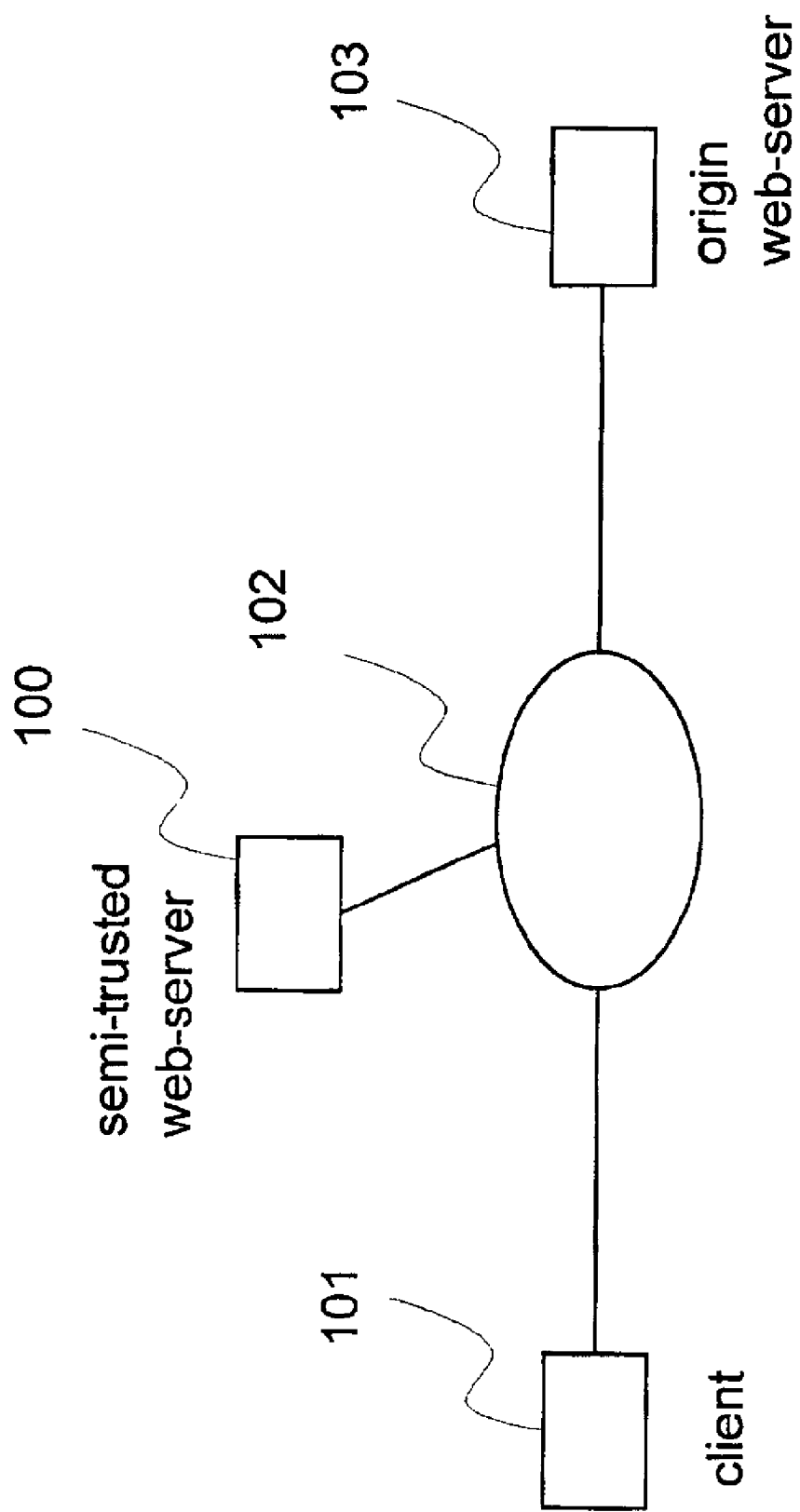
FIG. 1 shows an example of an environment having a client, an origin web-server, and a semi-trusted web-server, and the problems associated with a client accessing restricted information through the semi-trusted web-server.

The present invention enables a client to access restricted information through a semi-trusted web-server. A typical environment in which the access occurs is illustrated in FIG. 1. The figure shows a client, an origin web-server, and a semi-trusted web-server which are connected to a core network such as the Internet.

The client 101, semi-trusted web-server 104, and origin web-server 103 are connected to a core network 102.

The client, semi-trusted web-server, and origin web-server can be directly connected to the core network as exemplified in the figure, or they can be connected via intermediary firewalls, routers, and subnetworks. The semi-trusted web-server may be on the route that packets in the network follow when the client communicates with the origin web-server.

To shorten the length of time that the client must wait for a response to requests and to lighten the load on the origin web-server, the semi-trusted web-server may service the requests of the client. Generally, a semi-trusted web-server is chosen to service the requests of a client if the semi-trusted web-server is closer to the client than the origin web-server or if the semi-trusted web-server is less loaded than the origin web-server. In some configurations, clients always make requests to a semi-trusted web-server rather than the origin web-server. The semi-trusted web-server may respond to the client, fetching content from the origin web-server as necessary, or the semi-trusted web-server may refer the client to another semi-trusted web-server or the origin server if the semi-trusted web-server is unable to satisfy the client's request. In other configurations, a client first makes a request to the origin web-server. The origin web-server may refer the client to a semi-trusted web-server for the current request or all future requests, or the origin web-server may respond to part of the client's request but refer the client to a semi-trusted web-server for a portion of the response.

FIG. 1, the semi-trusted web-server is not necessarily considered to be under the control of the content provider or the origin web-server such that the semi-trusted web-server is not trusted with regard to the security policy for long-term sensitive data. However, the semi-trusted web-server is trusted for authorization, user identifiers, non-sensitive transactions, and SSL tunneling for content. Because the semi-trusted web-server is semi-trusted by the origin web-server, access control methods are needed to protect the restricted information at the semi-trusted web-server and to protect sensitive user credentials. Our patent provides techniques to provide access control to restricted information at the semi-trusted web-server without risking long-term sensitive data at the semi-trusted web-server such as user passwords.

Figure 2:
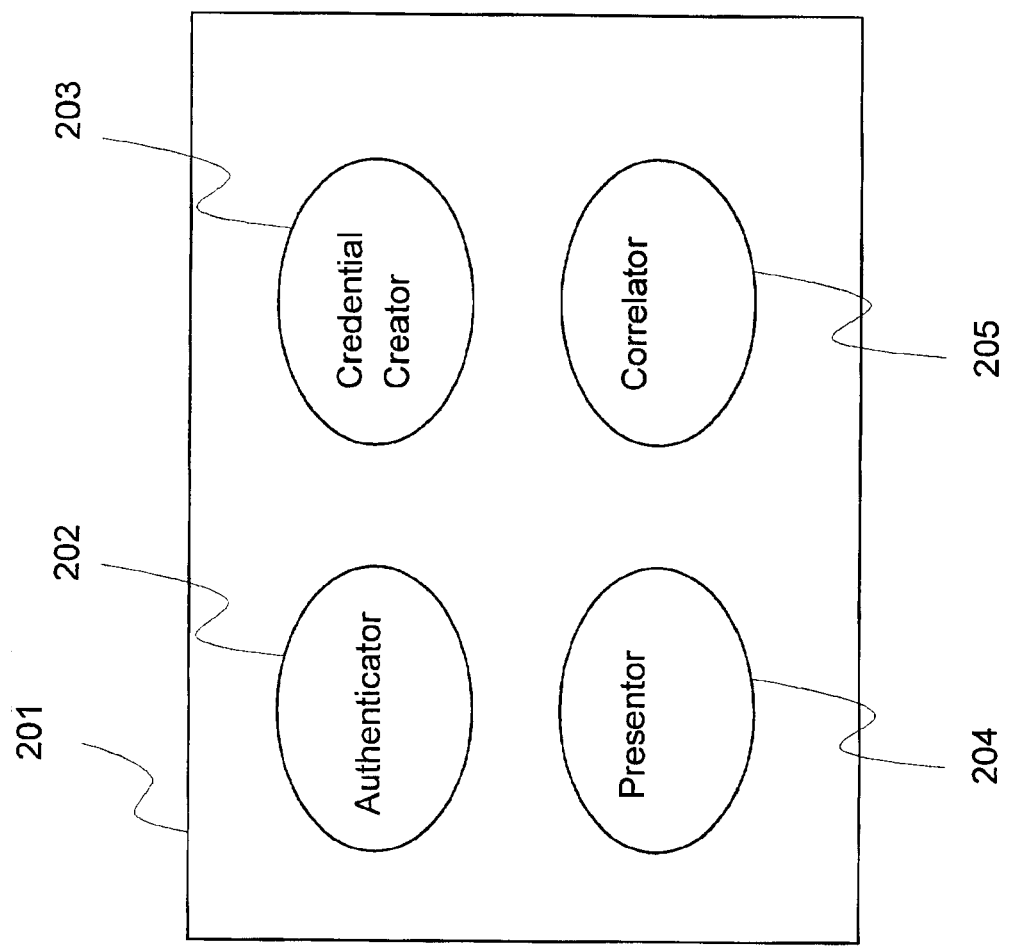
FIG. 2 shows the deployment of the method described in this invention for enabling a client to access restricted information in the environment described by FIG. 1. It shows the authenticator, creator, presentator, and correlator.

To enable a client to access restricted information at the semi-trusted web-server without risking long-term sensitive data, additional functions are needed. FIG. 2 shows the structure of any machine that is running in the network that can deploy the invention disclosed herein. The machine 201 may be distributed among the client, semi-trusted web-server, origin web-server, trusted agents of the client, trusted agents of the semi-trusted web-server, and trusted agents of the origin web-server. Any device 201 implementing this invention consists of four components including an authenticator 202, credential creator 203, credential presentator 204, and credential correlator 205. In some embodiments of this invention, the authenticator 202 may be provided by external services which are already present in the network. The authenticator 202 first authenticates the client 101 to the origin web-server 103. The credential creator 203 generates credential for the client to be used for subsequent communications. The credential presenter 204 communicates the client credential to the semi-trusted web-server 104. The credential correlator 205 correlates the client credential with the accessing client and the client user identifier.

When a client requests restricted information, the client is referred to the origin web-server for authentication. After credential creation, the client is referred back to the semi-trusted web-server to repeat the request and the credential presented to the semi-trusted web-server. After the credential correlation, the semi-trusted web-server responds to the client's request by providing the requested content if the credential is valid.

Figure 3:
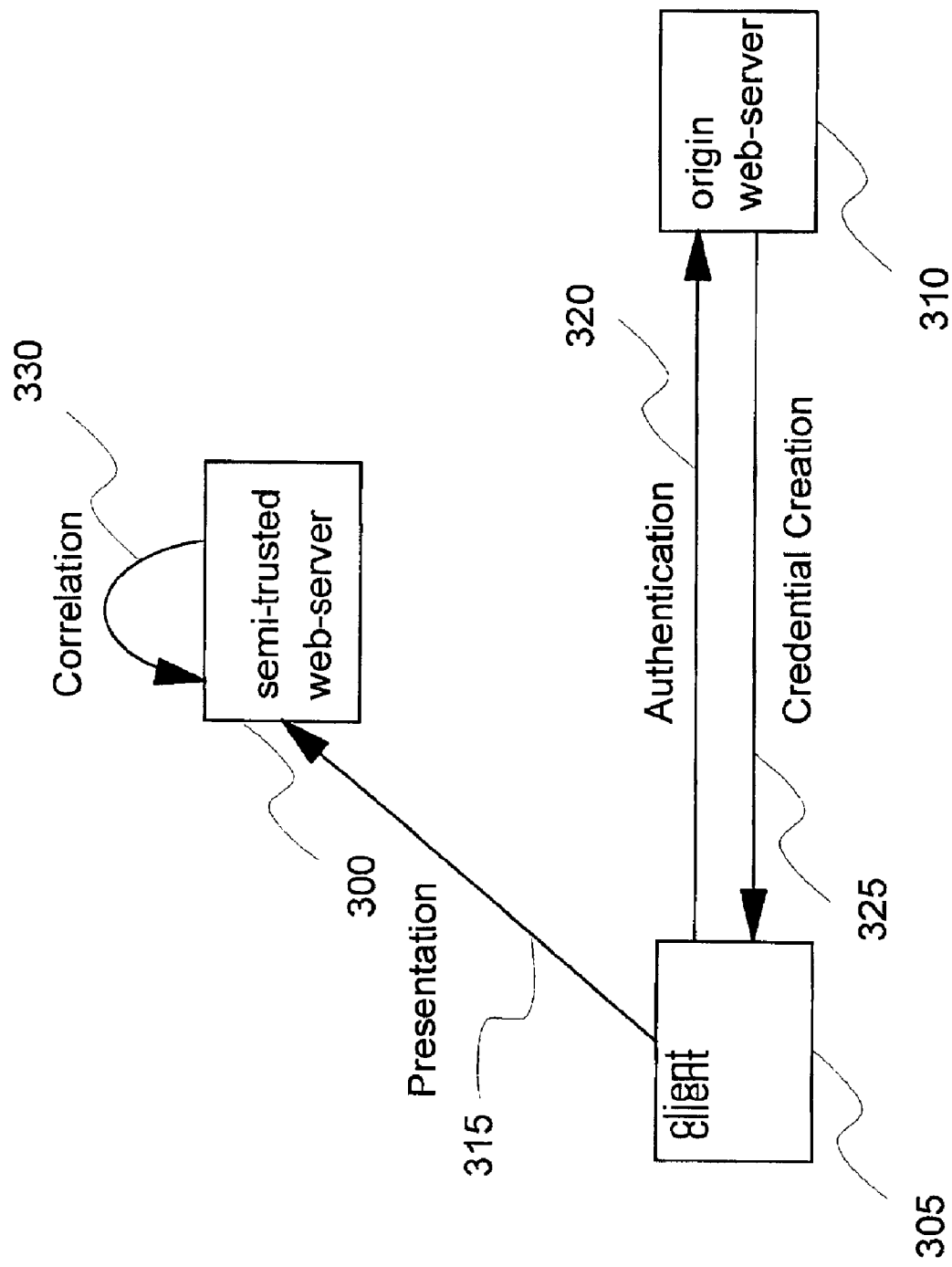
FIG. 3 shows a first embodiment of this invention illustrating a technique for presenting a client credential for the case when the semi-trusted web-server and the origin web-server are located in the same name space domain, (e.g. proxy.company.com and company.com respectively).
Figure 11:
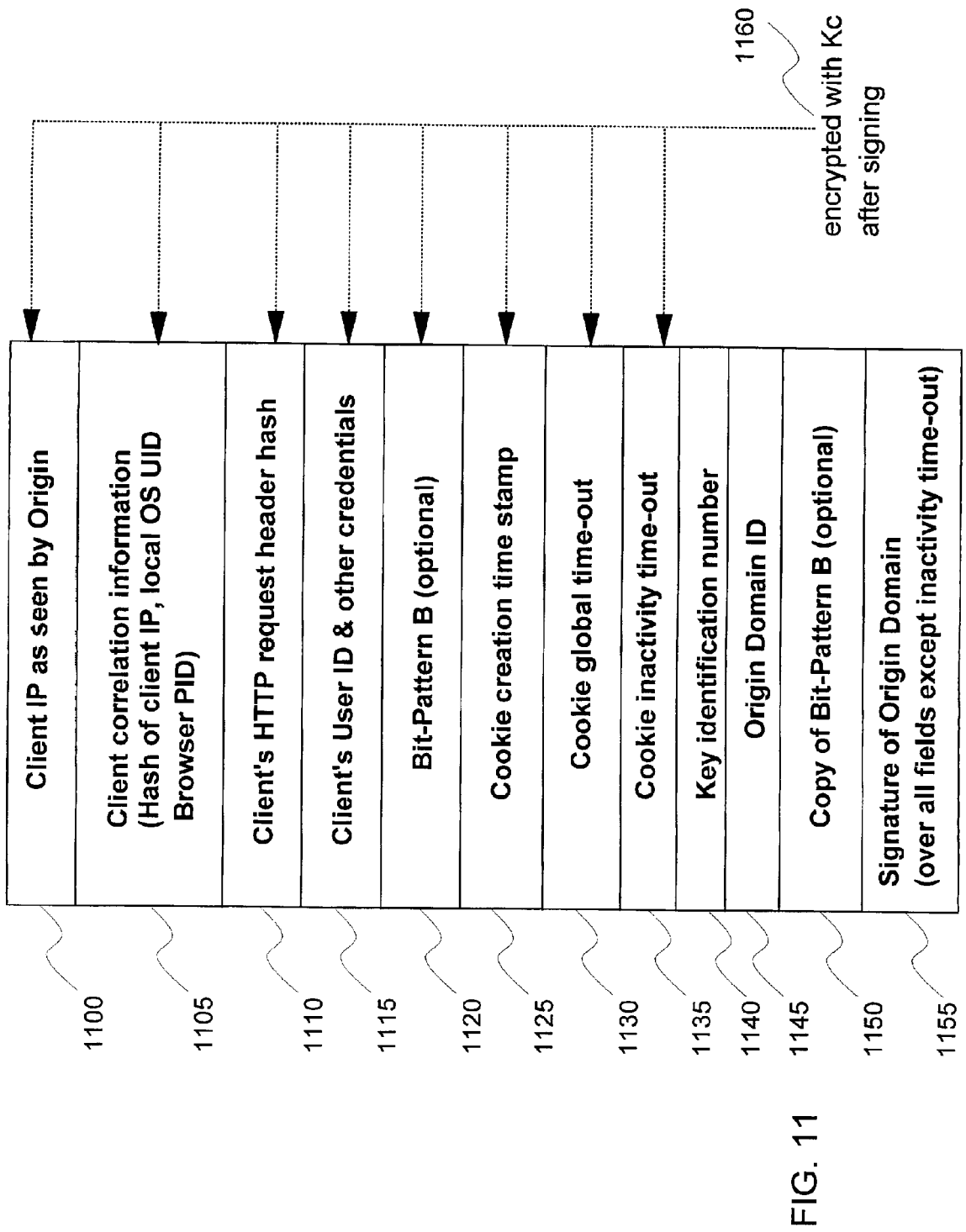
FIG. 11 shows a flowchart that illustrates the actions taken by the origin web-server for creating a cookie that will be presented to the semi-trusted web-server.

FIG. 3 shows a first embodiment of this invention illustrating a technique for presenting a client credential for the case when the semi-trusted web-server 300 and the origin web-server 310 are located in the same name space domain (e.g. proxy.company.com and company.com respectively). In this embodiment, the client makes a request to the origin web-server. The request is sometimes referred to the origin web-server by the semi-trusted web-server. The client is authenticated to the origin web-server with the authentication 320 component. At origin web-server, the credential creation 325 component creates a client credential in the form of an HTTP cookie which includes client-specific environment information such as the apparent client Internet Protocol (IP) address and the HTTP header information. The origin web-server sets the cookie on the client and the client is referred to the semi-trusted web-server by the origin web-server using HTTP redirection. Because the semi-trusted web-server and origin web-server are in the same name-space domain, the credential cookie will be presented to the semi-trusted web-server 315 when the client makes a request to the semi-trusted web-server. At the semi-trusted web-server, the credential correlation 330 component correlates the presented cookie to the client-specific environment information such as the apparent client IP address and the HTTP header information. If the cookie is valid, the semi-trusted web-server responds to the request using the access control of the user identifier specified in the cookie. The format and validation of the cookie are illustrated in FIG. 11.

Figure 4:
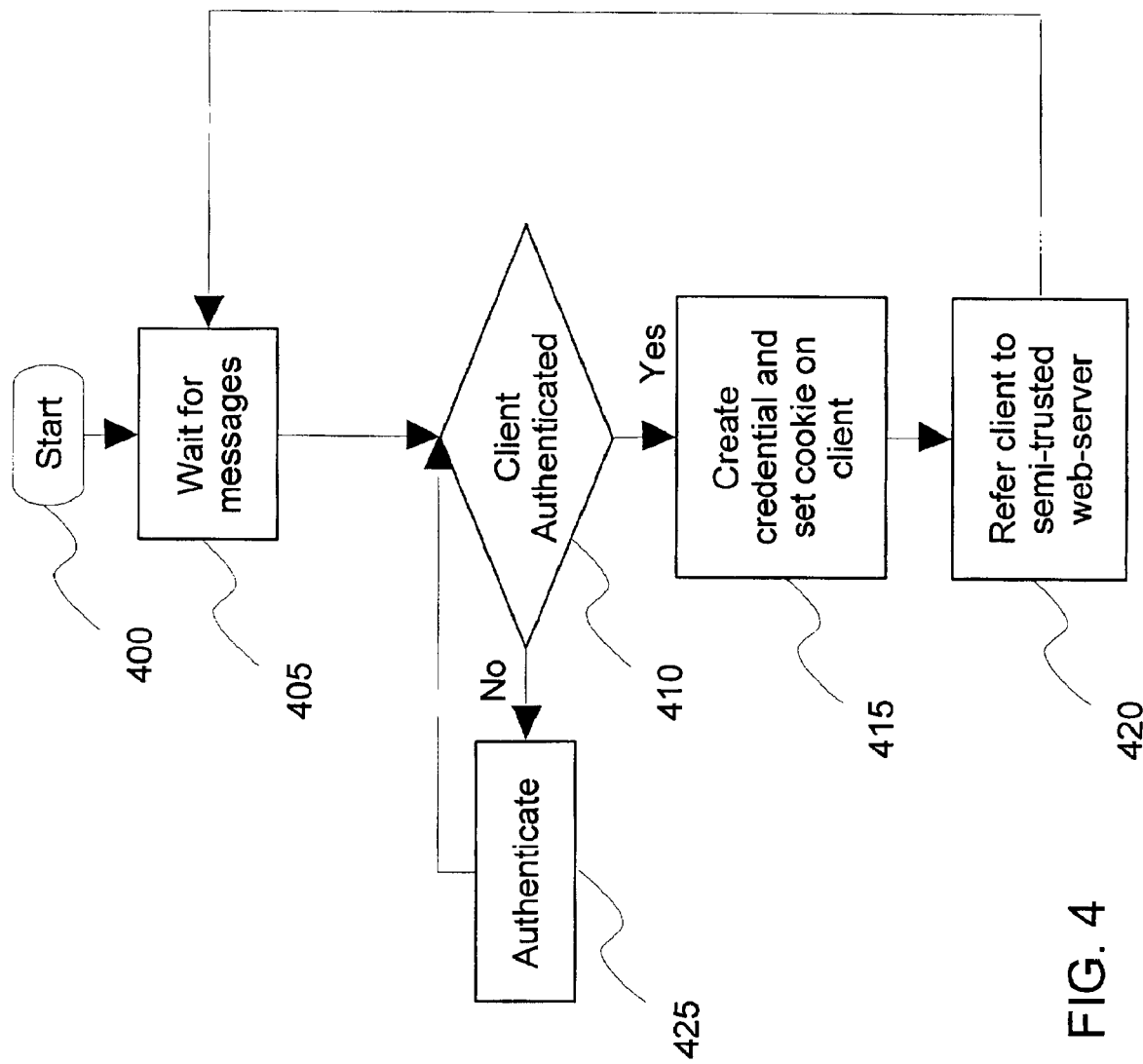
FIG. 4 shows a flowchart that illustrates the actions taken by the origin web-server for the embodiment shown in FIG. 3.
Figure 12:
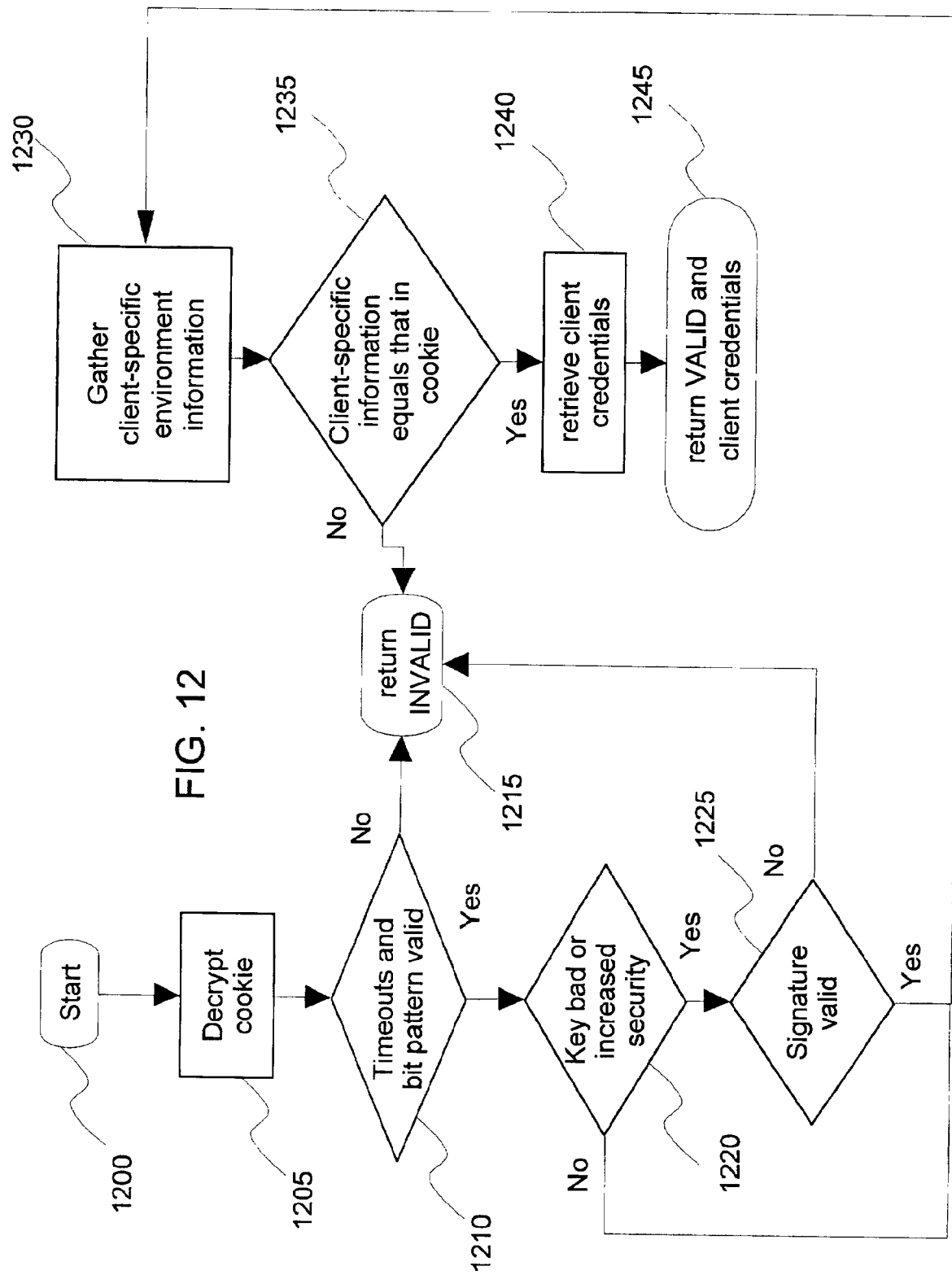
FIG. 12 shows a flowchart that illustrates the actions taken by the origin or semi-trusted web-server when validating a cookie as part of the correlation procedures.

FIG. 4 shows a flowchart that illustrates the actions taken by the origin web-server 310 for the embodiment shown in FIG. 3. The flowchart is entered in the step 401 whenever the device implementing the embodiment is started at the origin web-server 310. In step 405, the origin web-server waits for messages from a client. Upon receiving a message, in step 410 the origin web-server checks to see if the client is authenticated. The client may be authenticated by presenting a valid client credential as illustrated in FIG. 12, or the client may be authenticated by another scheme. If the client is not authenticated in step 410, then in step 425 the origin web-server initiates authentication and returns to step 410. If the client is authenticated in step 410, then step 415 is executed. In step 415, the origin web-server uses client-specific environment information to create a client credential which is stored in a cookie that is set on the client. Next, in step 420, the origin web-server refers the client to a semi-trusted web-server. Finally, the origin web-server returns to step 405 and waits for another message.

Figure 5:
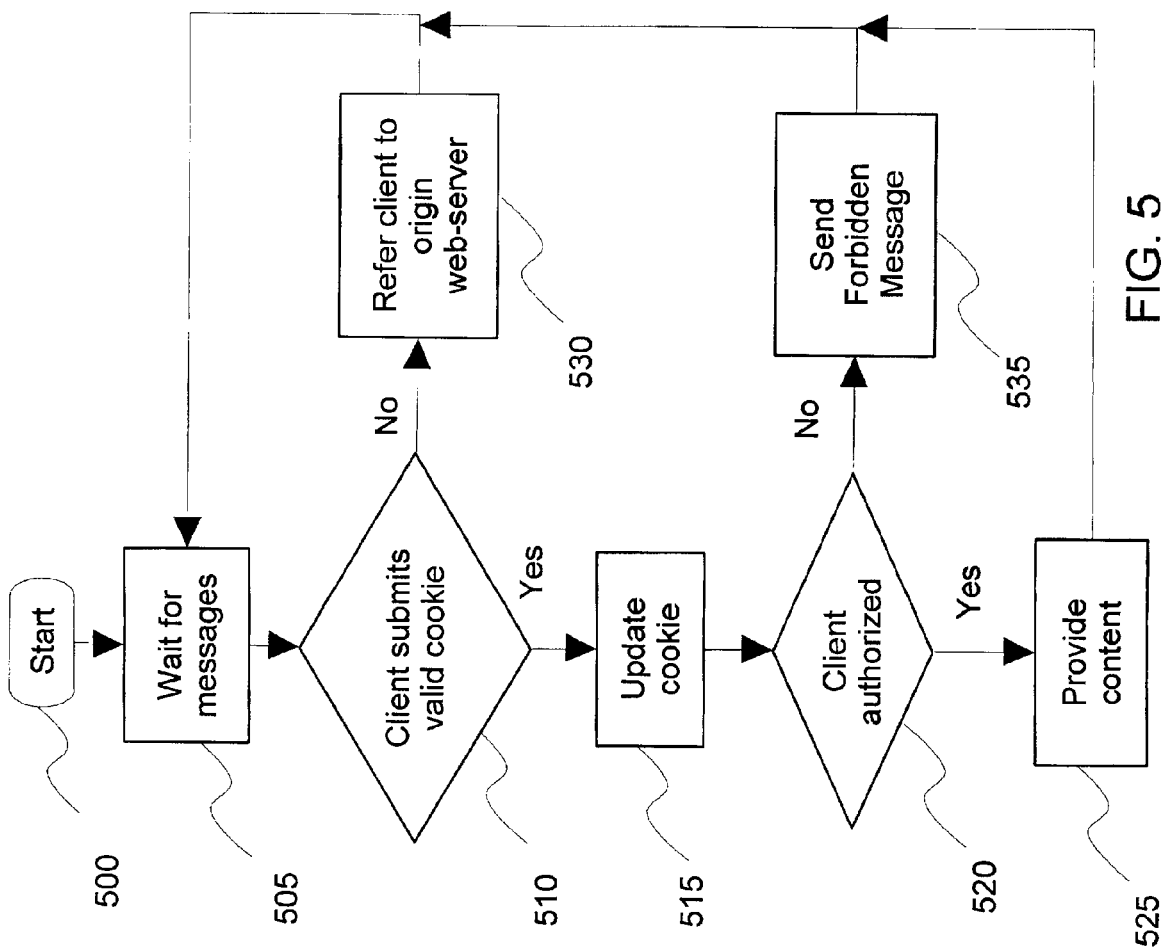
FIG. 5 shows a flowchart that illustrates the actions taken by the semi-trusted web-server for the embodiment shown in FIG. 3.
Figure 13:
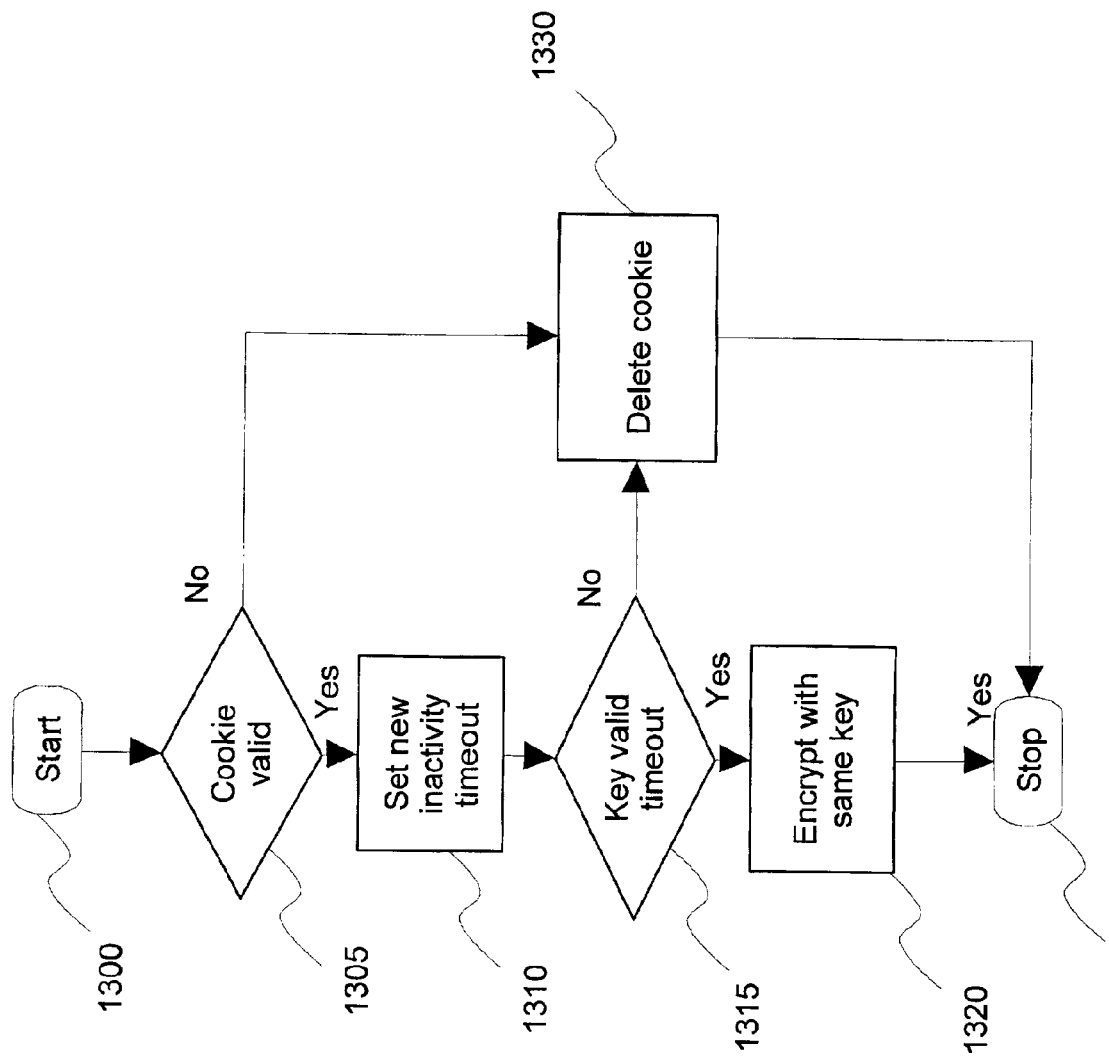
FIG. 13 shows a flowchart that illustrates the actions taken by the origin or semi-trusted web-server when updating a cookie as part of the procedures described above.

FIG. 5 shows a flowchart that illustrates the actions taken by the semi-trusted web-server 300 for the embodiment shown in FIG. 3. The flowchart is entered in step 500 whenever the device implementing the embodiment is started at the semi-trusted web-server 300. In step 505, the semi-trusted web-server waits for messages from clients. Upon receiving a message, the semi-trusted web-server checks to see if the client has submitted a cookie containing a valid client credential in step 510. Step 510 involves correlating the client credential in the cookie with client-specific information that the semi-trusted web-server obtains from the client as illustrated in FIG. 12. If the client credential is not valid in step 510, then step 530 is executed. In step 530, the semi-trusted web-server refers the client to the origin web-server and returns to step 505. If the client credential is valid in step 510, then step 515 is executed. In step 515, the cookie and client credential is updated as illustrated in FIG. 13. After step 515, the semi-trusted web-server checks to see if the client is authorized in step 520. If the client is not authorized in step 520, then step 535 is executed. In step 535, the semi-trusted web-server sends a forbidden message to the client and returns to step 505. If the client is authorized in step 520, then step 525 is executed and the content is provided to the client. Following step 525, the semi-trusted web-server returns to step 505 and waits for more messages.

Figure 6:
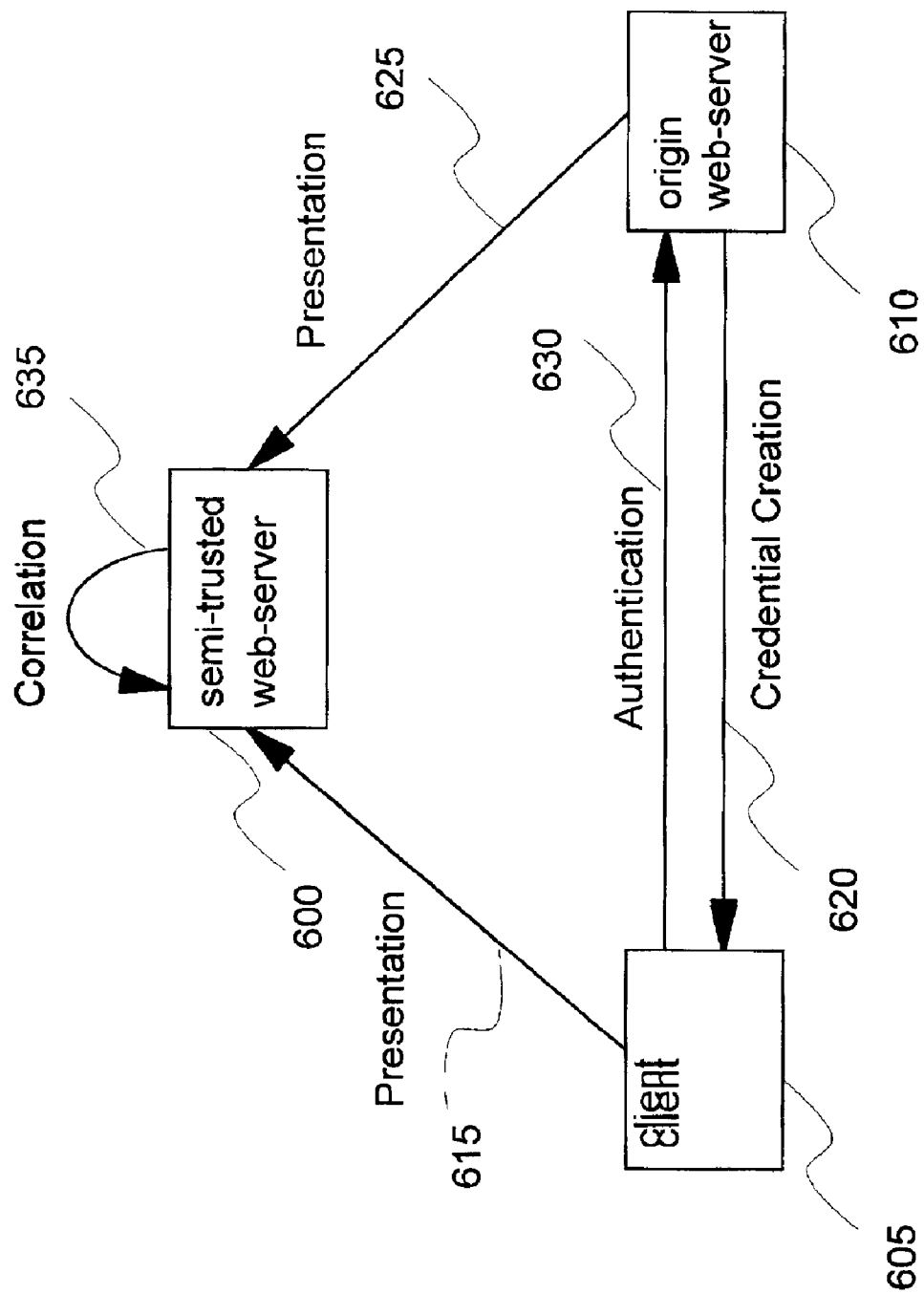
FIG. 6 shows a second embodiment in which the client credential is presented to the semi-trusted web-server by the origin web-server and the origin server redirects the client to the semi-trusted web-server with HTTP redirection. This embodiment addresses the case when the origin web-server and semi-trusted web-server are not located in the same domain.

FIG. 6 shows a second embodiment in which the client credential is presented to the semi-trusted web-server 600 by the origin web-server 610 and the origin server 610 redirects the client to the semi-trusted web-server 635 with HTTP redirection. This embodiment addresses the case when the origin web-server and semi-trusted web-server are not located in the same domain, although it can also be used if the servers are in the same domain. In this embodiment, the client makes a request to the origin web-server. The request is sometimes referred to the origin web-server by the semi-trusted web-server. The client is authenticated to the origin web-server with the authentication 630 component. At the origin web-server, the credential creation 620 component creates a client credential in the form of an HTTP cookie which includes client-specific environment information such as the apparent client Internet Protocol (IP) address and the HTTP header information. The presentation component 625 sends the client credential to the semi-trusted web-server 635, and then origin web-server 610 refers the client to the semi-trusted web-server by HTTP redirection including a reference to the client credential cookie in the HTTP redirection URL. When the client 605 makes a request to the semi-trusted web-server 635, the presentation component 615 gives a reference to the client credential cookie in the form of a URL query string, or if the client already has a client credential cookie the cookie is presented to the semi-trusted web-server. In the correlation component 635, the reference to the client credential cookie is used to select one of the stored cookies at the semi-trusted web-server, and then client-specific environment information such as the apparent client IP address and the HTTP header information is correlated to the client credential as illustrated in FIG. 12. If the client matches the client credential, then the semi-trusted web-server sets the cookie on the client for future requests and the semi-trusted web-server responds to the request using the access control of the user identifier specified in the cookie. The format and validation of the cookie are illustrated in FIG. 11.

Figure 7:
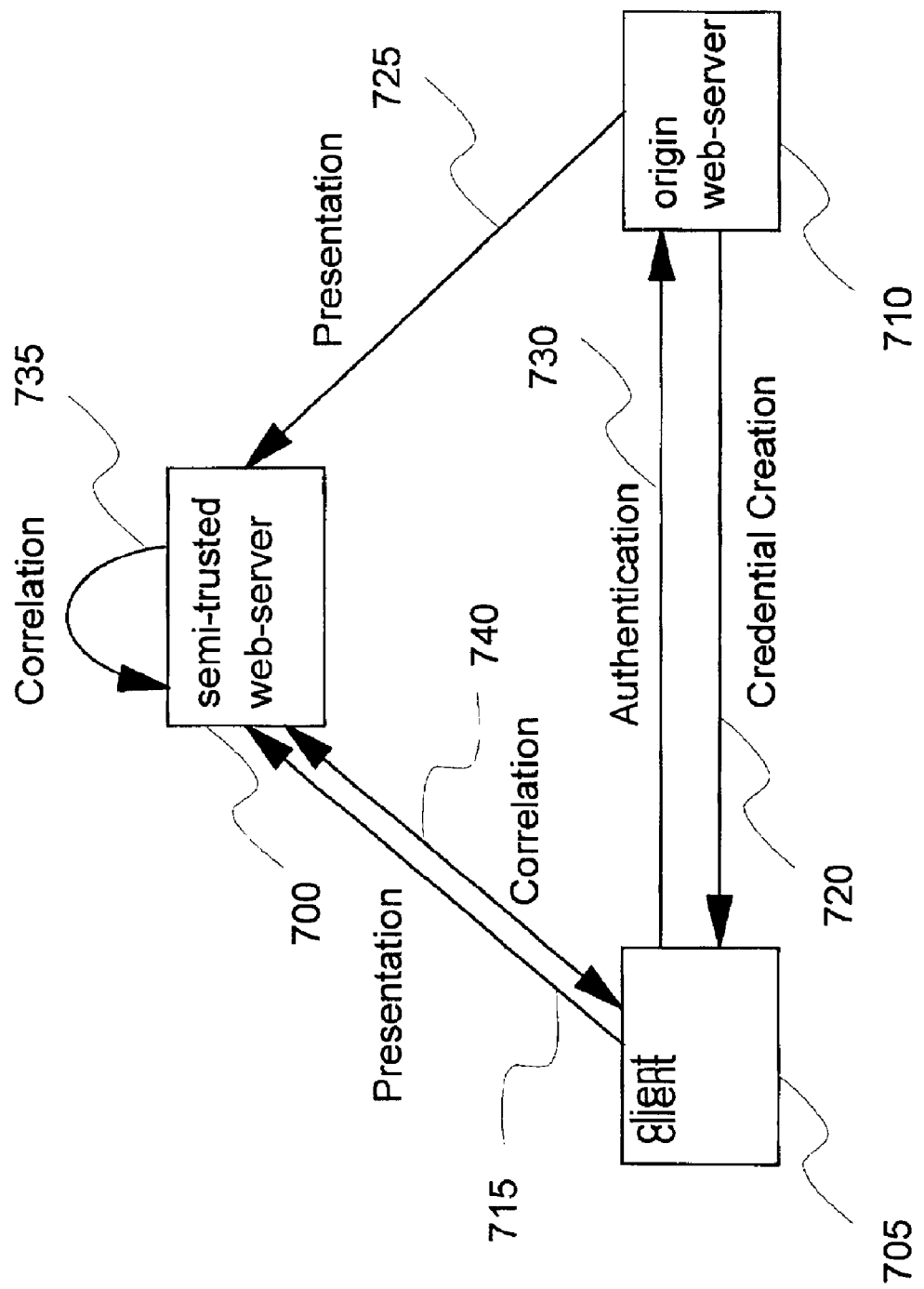
FIG. 7 shows a third embodiment in which correlation is aided by the origin web-server installing a first client-side program in the client browser that sends client-specific information to the origin web-server and by the semi-trusted web-server installing a second client-side program in the client browser that sends information to the semi-trusted web-server.

FIG. 7 shows a third embodiment in which correlation is aided by the origin web-server installing a first client-side program in the client browser that sends client-specific information to the origin web-server and by the semi-trusted web-server installing a second client-side program in the client browser that sends client-specific information to the semi-trusted web-server. This embodiment addresses the case when the origin web-server and semi-trusted web-server are not located in the same domain, although it can also be used if the servers are in the same domain. This embodiment further reduces the risk of using cookies for authentication by using more client-specific environment information. In this embodiment, the client makes a request to the origin web-server (possibly being referred to the origin web-server by the semi-trusted web-server). The client is authenticated to the origin web-server with the authentication 730 component, which may be enhanced with the first client-side program. At the origin web-server, the credential creation 720 component creates a client credential in the form of an HTTP cookie which includes client-specific environment information such as the apparent client Internet Protocol (IP) address and the HTTP header information, as well as additional client-specific environment information that is collected by the first client-side program such as a hash of the local IP address and browser application process identifier. The presentation component 725 sends the client credential to the semi-trusted web-server 735, and then origin web-server 710 refers the client to the semi-trusted web-server by HTTP redirection including a reference to the client credential cookie in the HTTP redirection URL. When the client 705 makes a request to the semi-trusted web-server 735, the presentation component 715 gives a reference to the client credential cookie in the form of a URL query string, or if the client already has a client credential cookie the cookie is presented to the semi-trusted web-server. In the correlation component 735, the reference to the client credential cookie is used to select one of the stored cookies at the semi-trusted web-server, and then client-specific environment information such as the apparent client IP address and the HTTP header information as well as additional client-specific environment information obtained by the correlation component 740 through the second client-side program is correlated to the client credential. If the client matches the client credential, then the semi-trusted web-server sets the cookie on the client for future requests and the semi-trusted web-server responds to the request using the access control of the user identifier specified in the cookie. The format and validation of the cookie are illustrated in FIG. 11.

Figure 8:
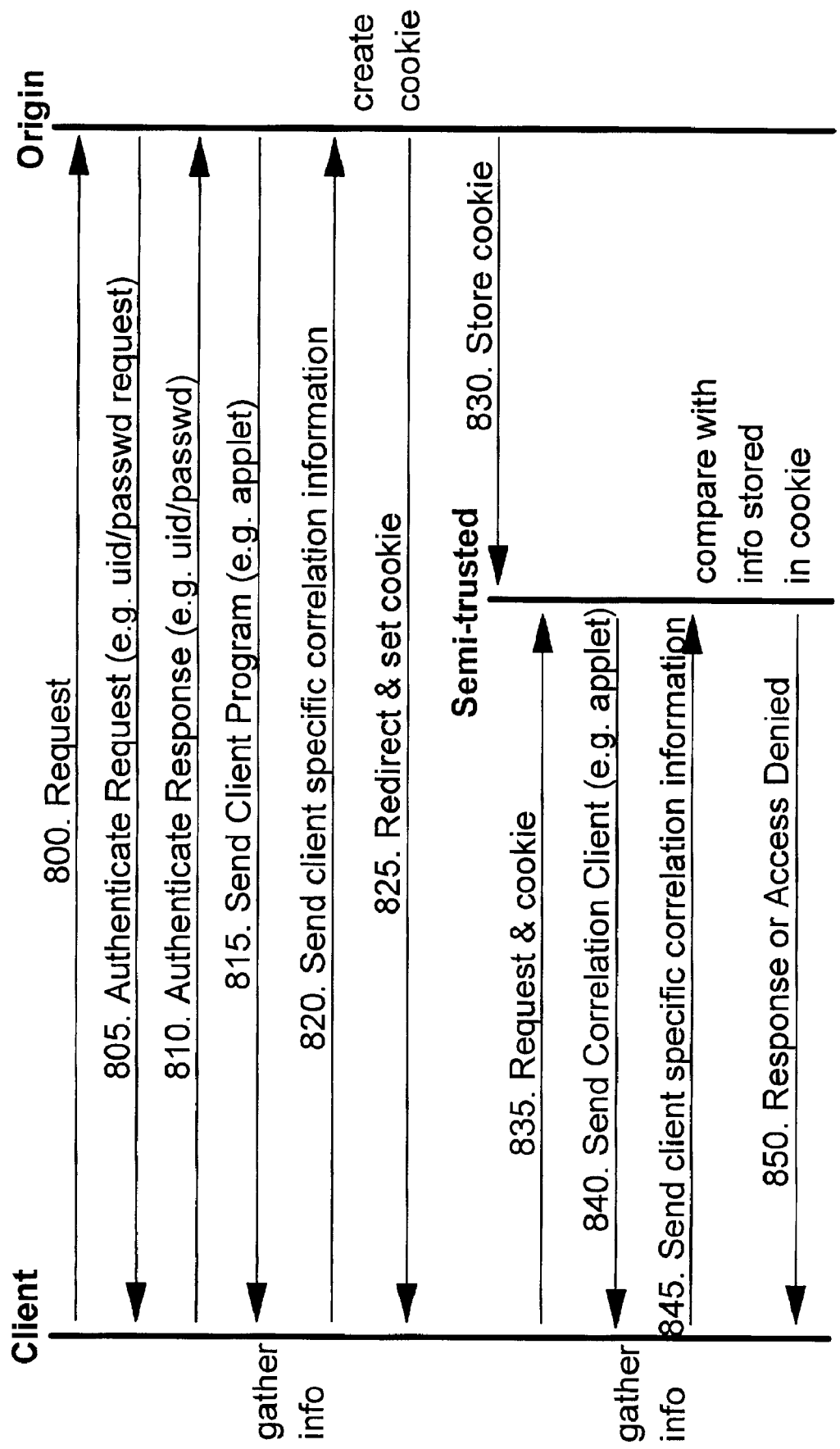
FIG. 8 shows the sequence of events for the embodiment shown in FIG. 7.

FIG. 8 shows the message exchange that occurs in the third embodiment as illustrated in FIG. 7. A client sends an HTTP request (800) to the origin web-server. The origin web-server replies with an authentication request message (805), which is presented to the user as a user ID and password prompt. The client replies with an authentication response message (810) including the authentication data. If the user ID and password are validated successfully at the origin web-server then the origin web-server sends a client program to the client (815). The client program runs on the client machine and gathers local environment information, e.g., process ID and user ID of the client's browser and local IP address. This information is hashed in the client for privacy and sent back as client specific correlation information to the origin web-server (820). The origin web-server creates a valid cookie as described later in FIG. 11 and includes a reference to the cookie in the redirection of the client (825). The original web-server also stores the cookie at the semi-trusted web-servers (830) or in a directory accessible to the semi-trusted web-servers. The client proceeds with sending the request to the semi-trusted web-server (835) as indicated in the redirection. If the semi-trusted web-server and original web-server share one domain, then the client includes the cookie. If the client does not include a cookie, then the semi-trusted web-server looks up the cookie from where it is stored by the origin web-server. If the semi-trusted web-server does not receive a cookie from the client and does not find a cookie in its accessible storage, then the semi-trusted web-server redirects the client to the original web-server and the process restarts at message 800. The semi-trusted web-server can implement protection against oscillating redirections by allowing a client only a small number of redirections in a specified time frame. If the semi-trusted web-server has access to the client's cookie, then it sends a correlation client program to the client (840), which gathers client environment information (see 815) and send a hash of it back to the proxy web-server (845). The semi-trusted web-server then verifies whether the client's environment hash matches the environment hash stored in the cookie. If not, then the semi-trusted web-server redirects the client to the origin web-server and the scenario restarts (800). If it matches, then the semi-trusted web-server validates the cookie (as described later in FIG. 11). If the cookie is valid, then the semi-trusted web-server extracts the client's credentials from the cookie and continues with the authorization. If the client's credentials are sufficient to access the requested information then access is provided to the client, if not then the access is denied (850). The semi-trusted web-server updates the cookie (as described in FIG. 11), sends the updated cookie with message 850 to the client, and stores the updated cookie in the accessible storage for semi-trusted web-servers.

Figure 9:
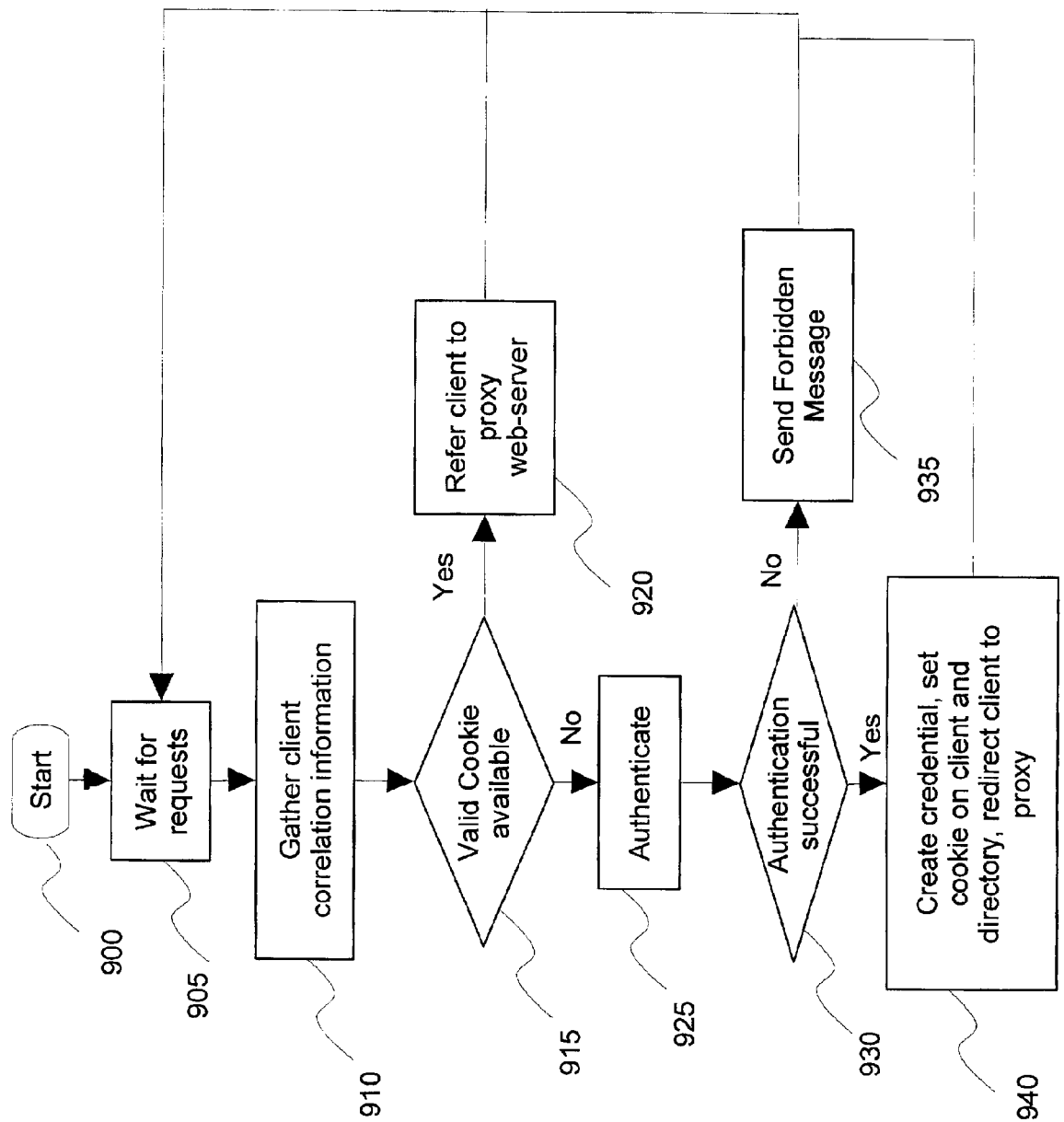
FIG. 9 shows a flowchart that illustrates the actions taken by the origin web-server for the embodiment shown in FIG. 7.

FIG. 9 shows a flowchart that describes the behavior of the origin web-server in the third embodiment as shown in FIG. 7. After starting the origin web-server (900), it waits for request messages (905). When receiving a client request, the origin web-server gathers client environment information (910) as described in FIG. 8 by sending a client side program to the client, which reports respective information. The origin web-server examines whether a valid cookie for this client exists (915). If yes, then the client is referred to a proxy web-server (920) and the origin web-server waits for other requests (905). Otherwise, the origin web-server authenticates the client (925) by sending an authentication request to the client and waiting for the authentication response (as described in FIG. 8, messages 805 and 810). If the authentication fails, then an access forbidden message is sent to the client (835) and the origin web-server waits for other requests (905). In this case, the origin web-server should audit the number of failed authentication procedures per client and lock accounts where a certain limit of successive authentication requests have failed. If the authentication is successful and no cookie is present then the origin web-server creates a cookie for the client as shown in FIG. 11, and sends the cookie to the client together with a redirection message that refers the client to a semi-trusted web-server (940). If origin and semi-trusted web-servers do not share the same domain, the cookie must be stored in a directory accessible to the semi-trusted web-servers. Otherwise this is optional. The origin web-server then returns to the state where it waits for incoming requests (905).

Figure 10:
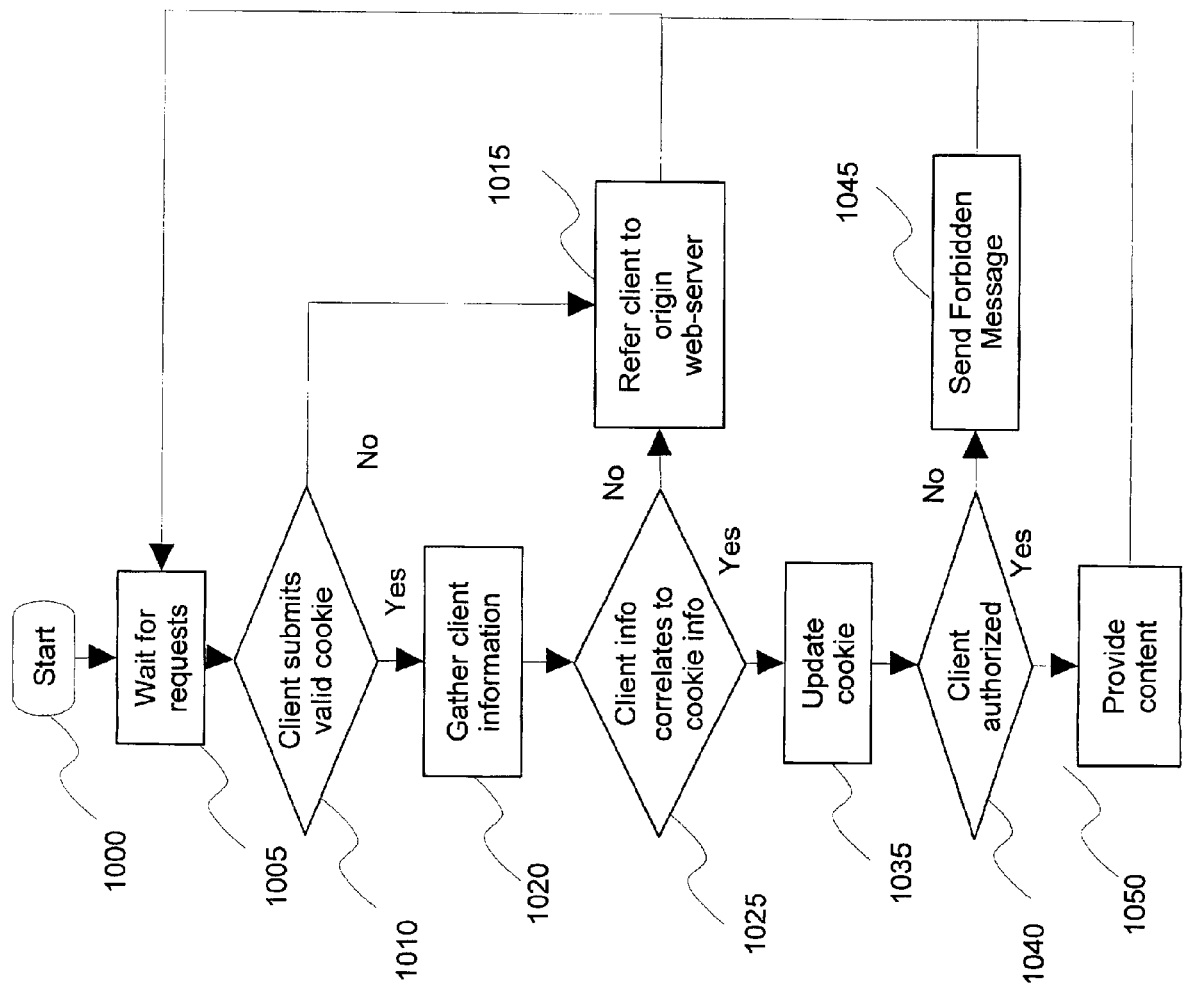
FIG. 10 shows a flowchart that illustrates the actions taken by the semi-trusted web-server for the embodiment shown in FIG. 7.

FIG. 10 shows a flowchart that describes the behavior of the semi-trusted web-server in the third embodiment as shown in FIG. 7. After starting the semi-trusted web-server (1000), it waits for incoming requests (1005). Next, the semi-trusted web-server checks whether it has as cookie for this client (1010). If the client does not submit a valid cookie with the request and the semi-trusted web-server does not have the client's cookie in other storage, e.g., in a directory, then the client is referred to the origin web-server (1015) for cookie creation. Otherwise, the semi-trusted web-server gathers client environment information (1020) using a client side program as described in FIG. 7. The semi-trusted web-server then verifies whether the gathered information and the client information stored in the cookie match (1025) as illustrated in FIG. 12. If it does not, then the client is referred to the origin web-server to create a valid cookie (1015). If it does, then the semi-trusted web-server updates cookie (1035) as described in FIG. 13. Then the semi-trusted web-server extracts the client's credentials from the cookie and checks the authorization of the client to access the requested information (1040). If the client is not authorized to access the requested information then the semi-trusted web-server sends a forbidden message to the client (1045) and returns to the waiting state (1005). If the client is authorized then the client is provided access (1050). Afterwards, the semi-trusted web-server returns to the waiting state (1005).

FIG. 11 illustrates an example of a client cookie that is created by the origin web-server. The cookie consists of two parts: one part is encrypted and one part is not encrypted. The encrypted part consists of the client's IP address as seen by the origin web-server (1100); optional client correlation information gathered either by a client-side program (1105); a hash of the client's request header as seen by the origin web-server (1110); the client's user identification as used for,authorization by the origin and semi-trusted web-server (1115); optionally a random bit pattern B (1120); a time stamp including the creation time of the cookie (1125); a global time out value valid for the whole domain (1130) which is usually a fixed offset added to the creation time; and a cookie inactivity time-out (1135) which is a fixed offset added to the cookie creation time. The clear part of the cookie includes the key identification number (1140), which denotes the key used to encrypt the upper part of the cookie; the domain name of the origin web-server (1145); optionally a copy of the encrypted random bit pattern B (1150); and finally a digital signature (1155) over the fields above whereby all fields are used in the clear for creating the signature. Afterwards, the fields of the first part are encrypted using the key Kc (1160) shared by the semi-trusted web-server and the origin web-server.

FIG. 12 shows a flowchart illustrating the process of validating a client cookie and returning client credentials in case the cookie is valid as part of the correlation procedures. The client cookie may be present in the HTTP request by the client, or the client may provide a reference to a cookie that is stored at the semi-trusted web-server or that is available to the semi-trusted web-server through an external device or directory. If no cookie is found, then the client is referred to the origin web-server so that the client can be authenticated and a cookie can be created. The cookie validation procedure starts at step 1200. In step 1205, the cookie is decrypted by using the domain identifier and key identifier to select an appropriate decryption key and by performing the decrypt operation. In step 1210, the global time-out and inactivity time-out fields are checked to see if the cookie has expired and the bit pattern is compared to the bit pattern copy. If the cookie has expired with either the global time-out or the inactivity time-out or if the bit pattern and bit pattern copy are not equal, then the cookie is invalid and step 1215 is executed. In step 1215, the process returns invalid and stops. If the cookie has not expired and the bit patterns match in step 1210, then step 1220 is executed. In step 1220, if the key used to decrypt the cookie in step 1205 has been marked as compromised or if heightened security is desired, step 1225 is executed; otherwise step 1230 is executed. In step 1225, the signature of the cookie is checked. If the signature does not match, then the cookie is invalid and step 1215 is executed. If the signature does match, then step 1230 is executed. In step 1230, client-specific environment information is gathered by the semi-trusted web-server. Some client-specific environment information such as apparent IP address and HTTP header hash may come from the client connection, while other client-specific environment information such as a hash of the local user identifier, browser process identifier, and IP address may be sent to the semi-trusted web-server by the second client-side program. After step 1230, in step 1235 the hash of client-specific environment information is checked for equality with the client-specific environment information stored in the cookie. If there is not equality in step 1235, then the cookie is invalid and step 1215 is executed. If there is equality in step 1235, then step 1240 is executed. In step 1240, the client access credentials in the cookie are retrieved. In step 1245, the validation process reports valid and returns the client's credentials to the caller. These credentials are used throughout the authorization to decide whether to provide access or not to the client.

FIG. 13 shows a flowchart illustrating the process of updating a client cookie. After starting execution in step 1300, step 1305 is executed. Step 1305 checks to see whether or not the cookie has been marked valid in the validation process illustrated in FIG. 12. If the cookie is not valid in step 1305, then step 1330 is executed. In step 1330, the cookie is deleted from the client, local storage, and any cookie directory or storage device and step 1325 is executed. In step 1325, the cookie update process stops. If the cookie is valid in step 1305, then a new inactivity time-out is set in step 1310 and step 1315 is executed. In step 1315, the semi-trusted web-server checks the key management system to see if the key used by the client is still valid. The key may not be valid if the key has timed out or if the origin web-server has sent a message to the semi-trusted web-server indicating that the key is no longer valid. If in step 1315, the key is no longer valid, then step 1330 is executed. If in step 1315, the key is valid, then in step 1320 the cookie is encrypted with the same shared key indicated in the key identifier field and step 1325 is executed.

Figure 14:
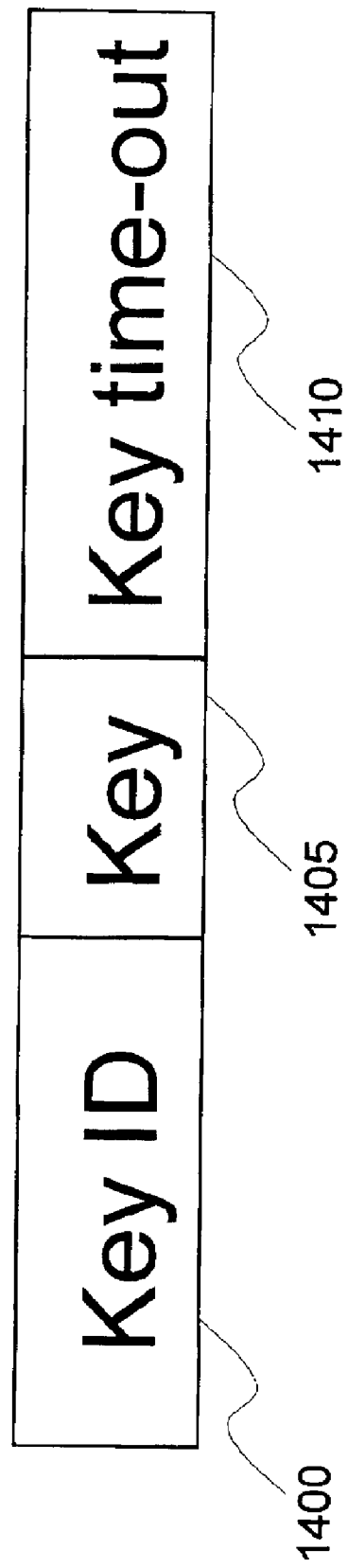
FIG. 14 illustrates the use of shared keys by semi-trusted and origin web-servers.

FIG. 14 illustrates the key entry used by semi-trusted web-servers and origin web-servers to protect part of the cookie both against unnoticed modification and disclosure. The key entry comprises of a key identification number (1400), the key itself (1405), and optionally a key time-out value (1410). At the beginning, the origin web-server creates a key entry with a new key, a new key identification number, and an empty time-out value and distributes it securely to all semi-trusted web-servers. The origin server includes in the appropriate cookie field (see FIG. 11), the key identification of the key that is used when creating the cookie. Once a semi-trusted web-server is known to be compromised, the origin web-server issues a new key entry with a new key identification number to those semi-trusted web-servers that are not compromised; this new key issue triggers the semi-trusted web-servers to set a global time-out value to the old key (e.g. 5 seconds). After this time-out value expires, cookies using the old key are no longer accepted (see FIG. 13) and clients presenting them are redirected to the origin web-server for authentication and creation of a new cookie. This way, cookies and user information related to cookies that were known by the compromised web server lose their value for replay attacks.

Figure 15:
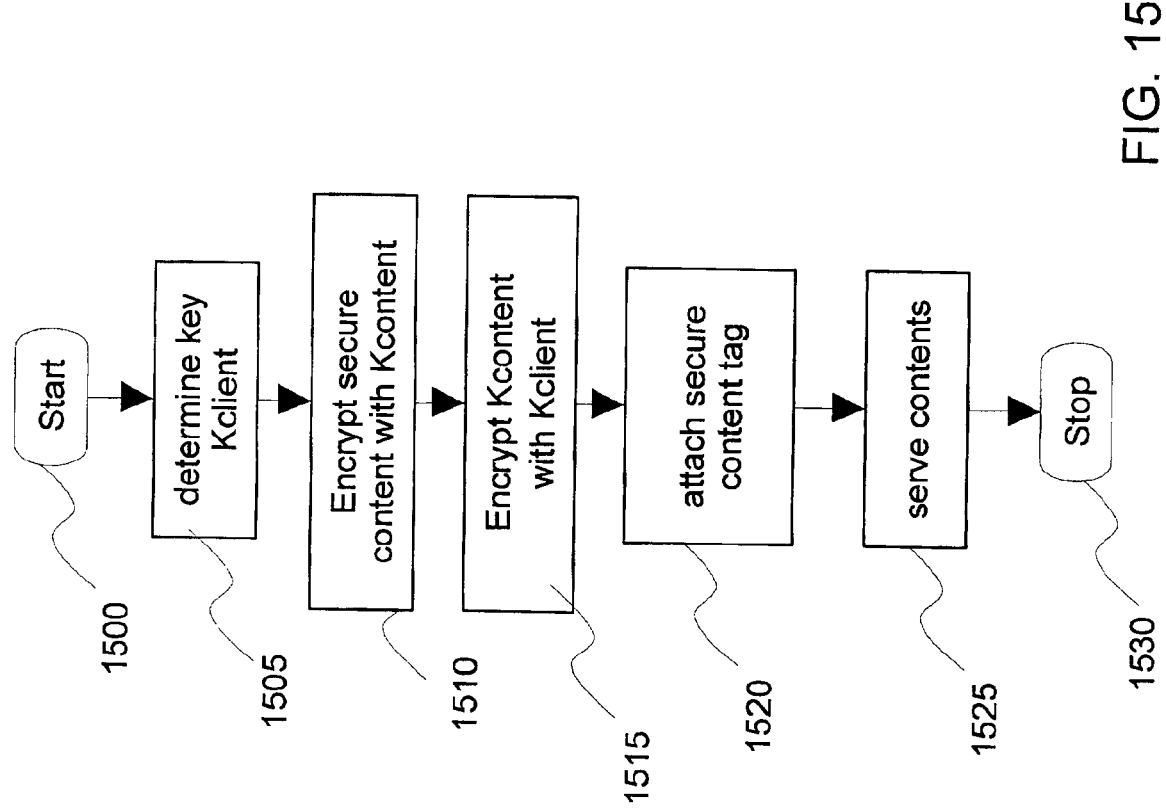
FIG. 15 shows a flowchart that illustrates the actions taken by the origin web-server when creating secure content for distribution through a semi-trusted web-server.

FIG. 15 shows a flowchart that illustrates the actions taken by the origin web-server when creating secure content for a client (1500). This part applies if the client retrieves information that shall be kept confidential even regarding the semi-trusted web-servers serving these data. Embedding secure content into information served by semi-trusted web-servers enhances scalability and security as most of the information retrieved is not highly sensitive and can be shared by many users leveraging caching in the semi-trusted web-server. The small amount of individual and sensitive data is retrieved transparently for the client and automatically by the semi-trusted web-server from the origin web-server. A special secure content handler, installed in the client, will present the secure content to the user in a way that makes secure and conventional data distinguishable for the user. To enable secure content, the content provider determines the key Kclient, which it shares with the client (1505). It then encrypts the sensitive content with a key Kcontent (1510). The key Kcontent is encrypted with Kclient and added to the secure content (1515). The content is marked with a new tag (1520) and then served either directly to the client or to the semi-trusted web-server which embeds the secure content as part of the content it serves to this client (1525). The procedure ends with 1530. Using an independent key Kcontent to encrypt sensitive content supports the use of encrypted content for different users which do not share the key Kclient; the origin web-server just needs to encrypt the common key multiple times instead of the whole content.

Figure 16:
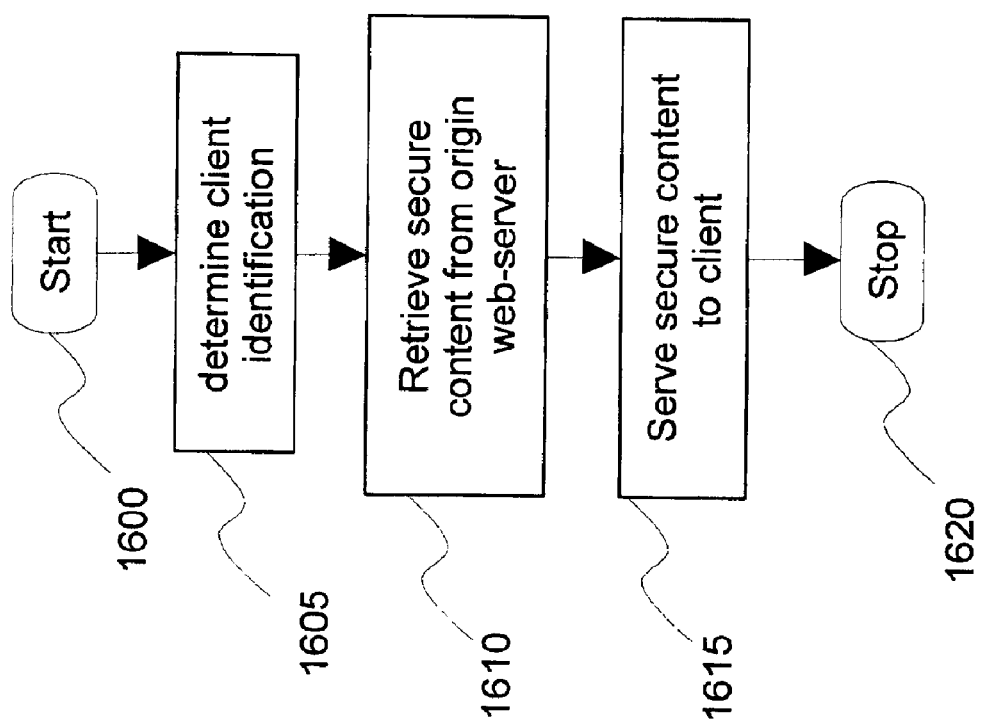
FIG. 16 shows a flowchart that illustrates the actions taken by the semi-trusted web-server when it serves partly secure content.

FIG. 16 shows a flowchart that illustrates the actions taken by the semi-trusted web-server when it serves partly secure content (1600). If the secure content is retrieved by the semi-trusted web-server, then client identification information (e.g. the client's cookie) is determined (1605) and presented to the origin web-server when retrieving the secure content from the origin web-server (1610). This identification enables the origin web-server to determine the key Kclient (see FIG. 15). The semi-trusted web-server receives the secure content for the client from the origin web-server and serves the content to the client (1615). Whether secure content can be cached or not depends on the content itself and is determined by the origin web-server. The procedure serving the secure content part of a request ends with 1620.

Figure 17:
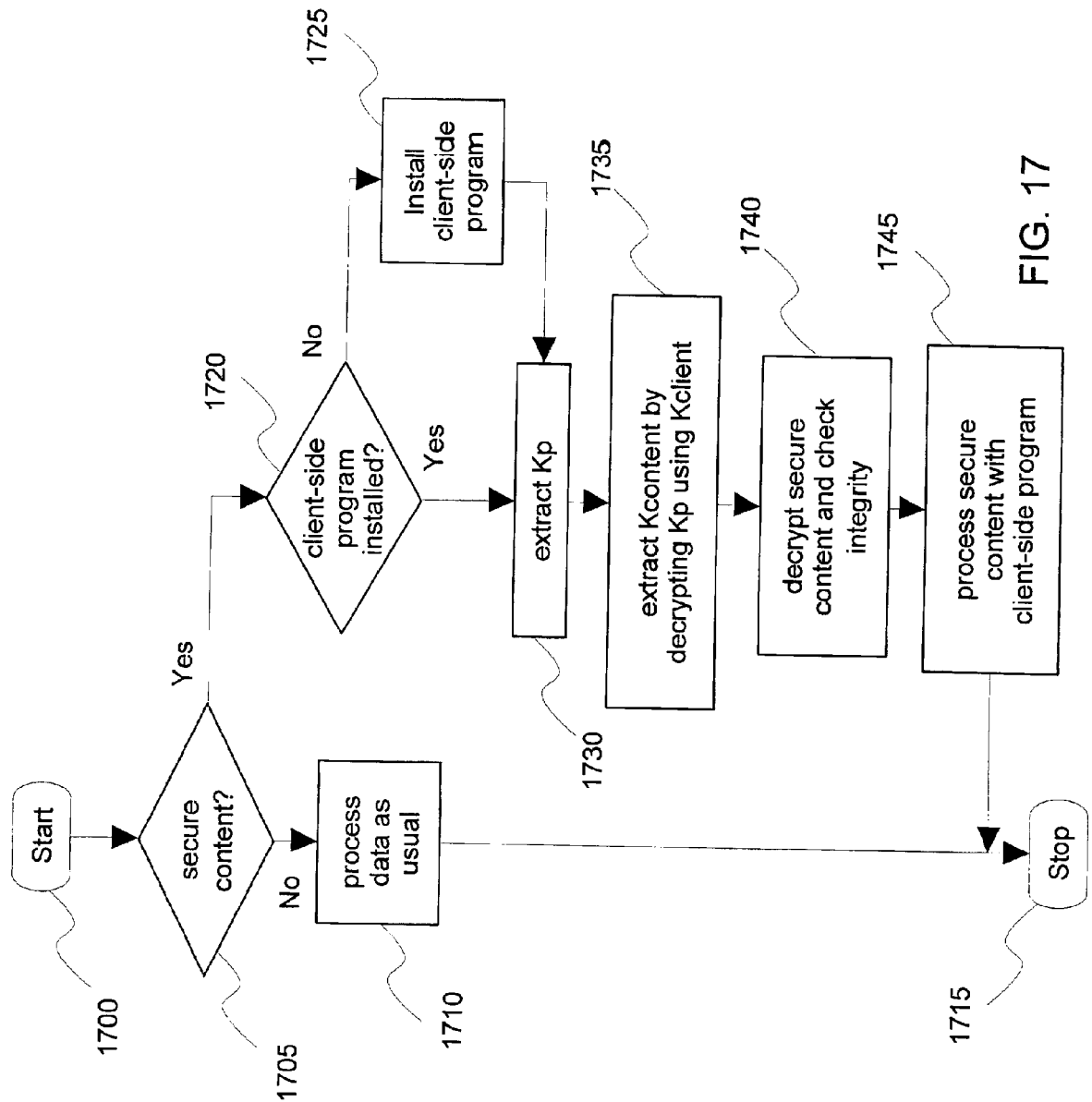
FIG. 17 shows a flowchart that illustrates the actions taken by the client when receiving secure content.

FIG. 17 shows a flowchart that illustrates the actions taken by the client when receiving secure content (1700). First, the client's browser will check whether it has a registered program for the type of content it received (1705). If the client receives conventional content then it processes the data with the existing content handlers (1710) and returns (1715). If the client receives data tagged as secure content, the browser will automatically look for the respective registered program to handle this content (1720). The client recognizes secure content by its special content tag (see FIG. 18). If the browser does not have registered a handler for secure content, then the user is prompted and must go through the installation procedure. The client-side handler for secure content is installed via a secure connection from the origin web-server; throughout this process (1725), the secure key Kclient is installed in the client program as well. Kclient is known only to the client-side program and the content provider, e.g., a cgi script or servlet in the origin web-server. Next, the client program as part of the web-browser is triggered to handle the secure content-type. The client-side program extracts the protected key, Kp, attached to the secure content (1730) and computes the decryption key Kcontent for the secure content by decrypting the key Kp with its own secret key Kclient (1735). The resulting key Kcontent is used to decrypt the secure content and check the integrity of the secure content (1740). The resulting cleartext can be handled as usual by the web-browser or can be presented by the client-side program in a way that shows users which part of a page is secure content and which part is not (1745).

Figure 18:
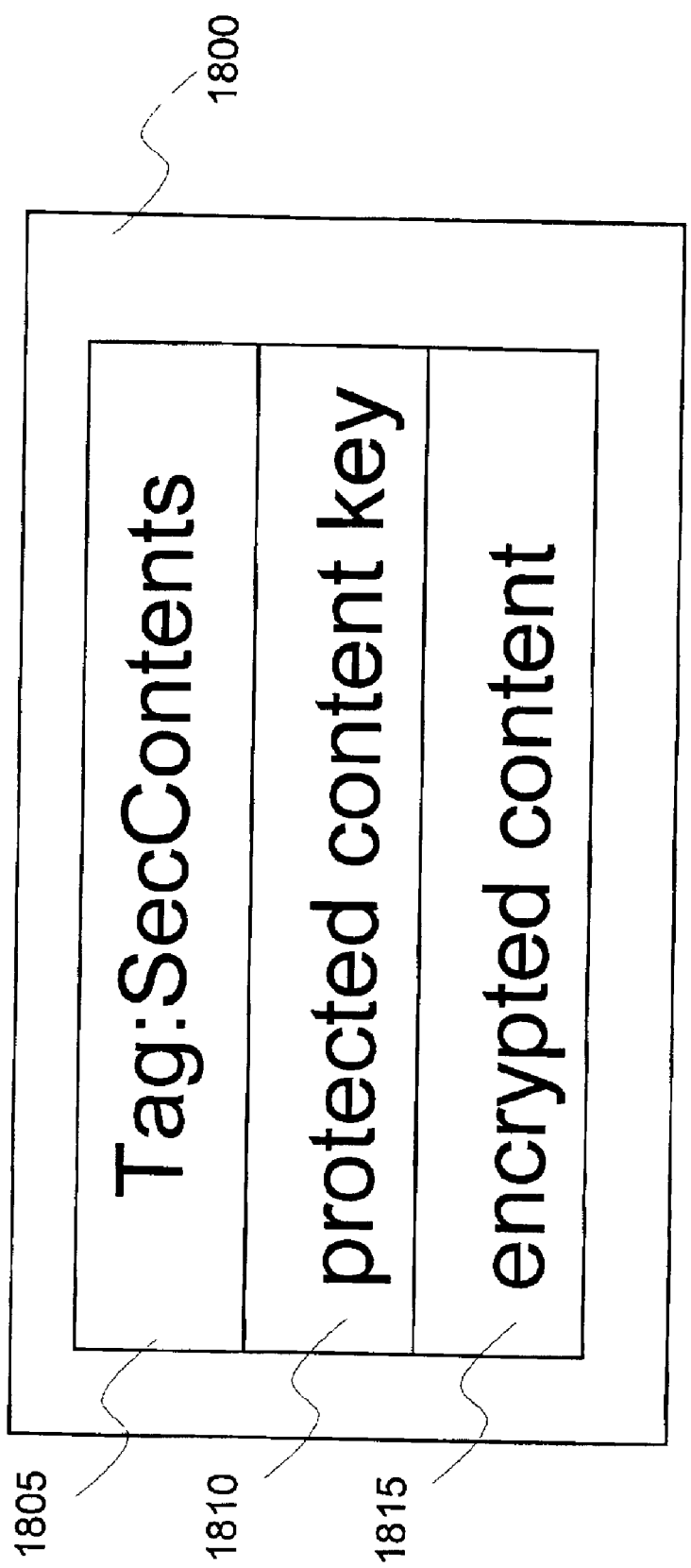
FIG. 18 illustrates the use of a new content-type that distinguishes secure content.

FIG. 18 illustrates the new content-type that is attached to secure content (1800). A new tag (1805) triggers the client's web-browser to activate the client-side program (installed as described in FIG. 15). The protected key section (1810) comprises the key, protected by Kclient, to decrypt the secure content. The tag is followed by the encrypted secure content (1815). One possibility to implement the secure content tag (1805) is to use a special file extension (e.g., ".sec"), which is handled by a new content handler. The file itself contains the protected content key (1810) and the secure content (1815). Another possibility is to define a new HTML-Tag for secure content, which implements the secure content tag (1805) and a pointer to the file including the protected content key (1810) and the secure content (1815).

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Having thus described our invention, what we claim as new and desire to secure by Letters Patent is as follows:

1. A method comprising:
   enabling at least one client to access restricted information from an origin web-server through a semi-trusted web-server including the steps of:
   authenticating said at least one client;
   creating a client credential having client-specific environment information for each said at least one client;
   presenting the client credential to the semi-trusted web-server;
   correlating said at least one client with the client credential; and
   providing said access to said at least one client.

2. A method as recited in claim 1, further comprising serving the restricted information to said at least one client through the semi-trusted web-server.

3. A method as in claim 1, wherein the step of creating comprises storing the client-specific environment information and the client credential in a cookie in said at least one client's browser.

4. A method as in claim 1, wherein the step of presenting comprises:
   sending the client credential to the semi-trusted web-server; and
   using HTTP redirection to refer said at least one client to the semi-trusted web-server.

5. A method as in claim 1, wherein the step of presenting comprises:
   sending said at least one client credential to a directory accessible to the semi-trusted web-server; and
   the origin web-server using HTTP redirection to send said at least one client to the semi-trusted web-server.

6. A method as in claim 1, wherein the step of creating comprises:
   collecting the client-specific environment information; and
   storing the client-specific environment information in the client credential.

7. A method as in claim 6, wherein the client-specific environment information includes:
   a hash of the HTTP-Request header of said at least one client request;
   a hash of the IP address of the machine used by said at least one client;
   a process identity of said at least one client browser;

a hash of a user identity used by said at least one client program; and/or any combination of these.

8. A method as in claim 6, wherein the step of collecting the client-specific environment information is performed by the origin web-server, and the origin web-server storing the client-specific environment information in the client credential.

9. A method as in claim 1, wherein the step of creating comprises:

placing a first client-side program at said at least one client;

collecting a first set of the client-specific environment information using the first client-side program;

sending the first set of the client-specific environment information to the origin web-server; and storing the first set of the client-specific environment information in the client credential.

10. A method as in claim 9, wherein the step of correlating includes:

the semi-trusted web-server placing a second client-side program at said at least one client;

collecting a second set of the client-specific environment information with the second client-side program;

sending the second set of the client-specific environment information to the semi-trusted web-server; and correlating the second set of the client-specific environment information to the client credential.

11. A method as in claim 10, wherein the first and/or the second client-specific environment information includes: a hash of the HTTP-Request header of said at least one client request; a hash of the IP address of the machine used by said at least one client; a process identity of said at least one client browser; a hash of a user identity used by said at least one client program; and/or any combination of these.

12. A method as in claim 1, further comprising the semi-trusted web-server accessing an encrypted version of the restricted information, and wherein the step of creating the client credential includes adding a decryption key to the client credential.

13. A method as in claim 12 wherein the decryption key is a partial key, and the step of providing includes the semi-trusted web-server supplying information to said at least one client enabling conversion of the partial key to a full key.

14. A method as in claim 1 wherein the step of authenticating includes employing a user-password scheme.

15. A method as in claim 1, wherein the step of authenticating includes deploying at least one certificate.

16. A method as in claim 8, wherein the steps of placing and the step of storing is performed by the origin web-server.

17. A method as recited in claim 1, wherein the semi-trusted web-server is a proxy web-server.

18. A method as recited in claim 1, wherein the step of creating a credential for said at least one client is at an origin web-server.

19. A method as recited in claim 1, wherein the step of correlating said at least one client and the client credential is performed by the semi-trusted web-server.

20. A method as recited in claim 1, wherein the step of authenticating said at least one client is performed at the origin web-server.

21. An article of manufacture comprising a computer usable medium having computer readable program code means embodied therein for enabling at least one client to access restricted information from an origin web-server through a semi-trusted web-server, the computer readable program code means in said article of manufacture comprising computer readable program code means for causing a computer to effect the steps of claim 1.

22. An article of manufacture as recited in claim 21, the computer readable program code means in said article of manufacture further comprising computer readable program code means for causing a computer to effect the steps of claim 13.

23. A program storage device readable by machine, tangibly embodying a program of instructions executable by the machine to perform method steps for enabling at least one client to access restricted information from an origin web-server through a semi-trusted web-server, said method steps comprising the steps of claim 1.

24. An apparatus for enabling at least one client to access restricted information from an origin web-server through a semi-trusted web-server, said apparatus comprising:

an authenticator to validate said at least one client;

a credential creator to create a client credential having client-specific environment information for each said at least one client; and a correlator for matching said at least one client to the client credential, and for working in combination with said authenticator and said credential creator to enable said at least one client to safely access restricted information from the origin web-server through the semi-trusted web-server.

25. A computer program product comprising a computer usable medium having computer readable program code means embodied therein for causing enablement of at least one client to access restricted information from an origin web-server through a semi-trusted web-server, the computer readable program code means in said computer program product comprising computer readable program code means for causing a computer to effect the apparatus of claim 24.

26. The apparatus as in claim 24, wherein the credential creator stores the client-specific environment information in a cookie set in said at least one client's browser.

27. An apparatus as in claim 24, wherein the credential creator presents the credential to the semi-trusted web-server.

28. The apparatus as in claim 24, wherein the credential creator stores a client-side program in said at least one client's browser.

29. The apparatus as in claim 24, wherein the correlator stores a second client-side program in the client's browser.

30. The apparatus as in claim 24, wherein the semi-trusted web-server has access only to an encrypted version of the restricted information, and the credential creator adds a decryption key to the client credential.

31. The apparatus as in claim 30, wherein the decryption key is a partial key and the semi-trusted web-server includes an information supplier to supply said at least one client with information to enable conversion of the partial key to a full key.

32. An apparatus comprising:

means for enabling at least one client to access restricted information from an origin web-server through a semi-trusted web-server including:

means for authenticating said at least one client;

means for creating a client credential having client-specific environment information for each said at least one client;

means for presenting the client credential to the semi-trusted web-server;

means for correlating said at least one client with the client credential; and means for providing said access to said at least one client.

33. An apparatus as recited in claim 32, further comprising means for serving the restricted information to said at least one client through the semi-trusted web-server.

34. An apparatus as in claim 32, further comprising means for storing the client-specific environment information and the client credential in a cookie in said at least one client's browser.

35. An apparatus as in claim 32, further comprising means for:
- sending the client credential to the semi-trusted web-server; and
- using HTTP redirection to refer said at least one client to the semi-trusted web-server.

36. An apparatus as in claim 32, wherein the origin web-server uses HTTP redirection to send said at least one client to the semi-trusted web-server, and further comprising means for sending said at least one client credential to a directory accessible to the semi-trusted web-server.

37. An apparatus as in claim 32, further comprising means for:
- collecting the client-specific environment information; and
- storing the client-specific environment information in the client credential.

38. An apparatus as in claim 37, wherein the client-specific environment information includes:
- a hash of the HTTP-Request header of said at least one client request;
- a hash of the IP address of the machine used by said at least one client;
- a process identity of said at least one client browser;
- a hash of a user identity used by said at least one client program; and/or
- any combination of these.

39. An apparatus as in claim 32, further comprising means for:
- placing a first client-side program at said at least one client;
- collecting a first set of the client-specific environment information using the first client-side program;
- sending the first set of the client-specific environment information to the origin web-server; and
- storing the first set of the client-specific environment information in the client credential.

40. An apparatus as in claim 39, further comprising means for:
- the semi-trusted web-server to place a second client-side program at said at least one client;
- collecting a second set of the client-specific environment information with the second client-side program;
- sending the second set of the client-specific environment information to the semi-trusted web-server; and
- correlating the second set of the client-specific environment information to the client credential.

41. An apparatus as in claim 40, wherein the first and/or the second client-specific environment information includes:
- a hash of the HTTP-Request header of said at least one client request;
- a hash of the IP address of the machine used by said at least one client;
- a process identity of said at least one client browser;
- a hash of a user identity used by said at least one client program;
- and/or any combination of these.

42. An apparatus as in claim 32, further comprising means for the semi-trusted web-server to access an encrypted version of the restricted information, and means for adding a decryption key to the client credential during creation.

43. An apparatus as in claim 42, wherein the decryption key is a partial key comprising means for the semi-trusted web-server to supply information to said at least one client enabling conversion of the partial key to a full key.

44. An apparatus as in claim 32, further comprising of a means for authenticating by employing a user-password scheme.

45. An apparatus as in claim 32, further comprising of a means for authenticating by deploying at least one certificate.

46. A computer program product comprising a computer usable medium having computer readable program code means embodied therein for causing enablement of at least one client to access restricted information from an origin web-server through a semi-trusted web-server, the computer readable program code means in said computer program product comprising computer readable program code means for causing a computer to effect the apparatus of claim 32.

* * * * *